(12) United States Patent
Noziere (10) Patent No.: US 11,994,883 B2
(45) Date of Patent: May 28, 2024

(54) METHOD FOR OPTIMISING THE ENERGY EXPENDITURE AND COMFORT OF A BUILDING

(71) Applicant: OZE Energies, Charenton-le-pont (FR)

(72) Inventor: Gilles Noziere, Charenton-le-pont (FR)

(73) Assignee: OZE ENERGIES, Charenton-le-Pont (FR)

( * ) Notice: Subject to any disclaimer, the term of this patent is extended or adjusted under 35 U.S.C. 154(b) by 752 days.

(21) Appl. No.: 16/976,394

(22) PCT Filed: Jan. 21, 2019

(86) PCT No.: PCT/FR2019/050123
§ 371 (c)(1),
(2) Date: Aug. 27, 2020

(87) PCT Pub. No.: WO2019/166710
PCT Pub. Date: Sep. 6, 2019

(65) Prior Publication Data
US 2021/0055750 A1     Feb. 25, 2021

(30) Foreign Application Priority Data

Feb. 28, 2018  (FR) ...................................... 1851762

(51) Int. Cl.
*G06N 20/00*       (2019.01)
*G05B 19/042*   (2006.01)
(Continued)

(52) U.S. Cl.
CPC ....... *G05D 23/1917* (2013.01); *G05B 19/042* (2013.01); *G06F 30/18* (2020.01);
(Continued)

(58) Field of Classification Search
CPC .... G05D 23/1917; G06N 20/00; G06F 30/18; G06F 2111/06; G05B 19/042; G05B 2219/2614
(Continued)

(56) References Cited

U.S. PATENT DOCUMENTS 9,612,591 B2     4/2017  Sloop et al.
2015/0192911 A1*  7/2015  Sloop ................. G05D 23/1917
                                                  700/291

OTHER PUBLICATIONS

Yu, Wei, et al. "Application of multi-objective genetic algorithm to optimize energy efficiency and thermal comfort in building design." Energy and Buildings 88 (2015). pp. 135-143. (Year: 2015).*
(Continued)

*Primary Examiner* — John E Johansen
(74) *Attorney, Agent, or Firm* — TraskBritt (57) ABSTRACT

A method for optimizing the energy expenditure and the comfort of a building, including comfort systems provided with an online consumption sensor, local environment data sensors associated with an identifier of a zone of the building, and at least one server for collecting and recording the timestamped data remotely includes the following steps: —constructing and saving a simplified digital model of the thermal behavior of the building; —a step of calibrating the simplified digital model calculated during the preceding step; —a step of validating the calibrated digital model calculated during the preceding step by comparing the digital variables obtained by predictive processing of the calibrated model and the digital variables stored by the server over a period of a few days; —a step of calculating digital parameters for resource allocation by applying a Pareto optimum calculation applied to the validated calibrated digital model.

6 Claims, 3 Drawing Sheets

(51) Int. Cl.
   *G05D 23/19*    (2006.01)
   *G06F 30/18*    (2020.01)
   *G06F 111/06*   (2020.01)
(52) U.S. Cl.
   CPC ..... *G06N 20/00* (2019.01); *G05B 2219/2614* (2013.01); *G06F 2111/06* (2020.01)
(58) Field of Classification Search
   USPC .......................................................... 703/2
   See application file for complete search history.

(56) References Cited

OTHER PUBLICATIONS

Rathore, M. Mazhar, et al. "Urban planning and building smart cities based on the internet of things using big data analytics." Computer networks 101 (2016). pp. 63-80. (Year: 2016).*
O'Neill, Zheng, and Bryan Eisenhower. "Leveraging the analysis of parametric uncertainty for building energy model calibration." Building simulation. vol. 6. Springer Berlin Heidelberg, 2013. (Year: 2013).*
Translation of PCT/FR2019/050123 written report dated Apr. 26, 2019. (Year: 2019).*
International Search Report for International Application No. PCT/FR2019/050123 dated Apr. 26, 2019, 2 pages.
International Written Opinion for International Application No. PCT/FR2019/050123 dated Apr. 26, 2019, 5 pages.
O'Neill et al., Leveraging the Analysis of Parametric Uncertainty for Building Energy Model Calibration, Build Simul, vol. 6, (2013), pp. 365-377.
Yu et al., Application of Multi-Objective Genetic Algorithm to Optimize Energy Efficiency and Thermal Comfort in Building Design, Energy and Buildings, vol. 88, (2015), pp. 135-143.

\* cited by examiner

METHOD FOR OPTIMISING THE ENERGY EXPENDITURE AND COMFORT OF A BUILDING

CROSS-REFERENCE TO RELATED APPLICATIONS

This application is a national phase entry under 35 U.S.C. § 371 of International Patent Application PCT/FR2019/050123, filed Jan. 21, 2019, designating the United States of America and published as International Patent Publication WO 2019/166710 A1 on Sep. 6, 2019, which claims the benefit under Article 8 of the Patent Cooperation Treaty to French Patent Application Serial No. 1851762, filed Feb. 28, 2018.

TECHNICAL FIELD

The present disclosure relates to the field of optimizing heating, ventilation and air conditioning systems in large buildings. The method used relies on simulations carried out using a digital model combined with advanced statistical learning and stochastic optimization tools.

BACKGROUND

The object is to reduce overall energy expenditure while improving the comfort perceived by the users of a building, by constructing a digital model that allows advanced controls to be parameterized for the set points of the technical management systems, for the operation of air conditioning systems and more generally all the systems that lead to energy expenditure on the one hand and that contribute to the comfort perceived by users on the other.

As an example, the U.S. Energy Information Administration agency estimates that heating, cooling, lighting, refrigeration and water heating represent about 55% of the energy consumption for a building in the commercial sector.

Energy consumption for lighting (about 10%) can be reduced without diminishing perceived comfort by replacing conventional lighting with lighting that uses electroluminescent diodes (LED) instead of fluorescent lamps. It is therefore crucial to improve other types of energy usage in order to control the environmental impact of buildings management (by reducing greenhouse gas emissions such as carbon dioxide) and to enhance financial efficiency (by reducing energy bills with new, suitably scaled contracts).

A specific problem linked to reducing the energy consumption of commercial or public buildings is maintaining and controlling thermal comfort inside these buildings during occupation, while taking account of the dynamics of the building and changes in the weather, reducing consumption during periods of inoccupation and restarting the heating, ventilation and air conditioning in a timely fashion after an idle period.

Typically, two approaches to producing an optimal energy efficiency and comfort strategy are observed.

The first approach relies on physical simulators, based on a model of an entire building, taking account of the geometry of the building, its envelope, the internal loads, the air conditioning and ventilation systems and the weather data. This digital model is then used to simulate the energy consumptions and temperatures inside the building. Various algorithms may then be used to estimate the best management parameters (programming, temperature set points) in order to reduce consumption while ensuring optimal thermal comfort. This simulation-based approach may provide acceptable precision, but requires a great deal of effort of precise data that is difficult, and therefore costly, or even impossible, to obtain (for example, the actual system settings, the actual heat contributed by office equipment and lighting, the actual air-tightness of the building, the true characteristics of the climate control systems, etc.). It is then very costly in engineering terms to achieve sufficient precision to embed all the parameters of the thermal simulation model associated with each building. It is also very dependent on the quality and relevance of the physical simulation model used.

The second approach attempts to model the energy consumption of buildings based on an analysis of its correlation with other variables such as indoor temperature, outdoor temperature and occupation of the building. It uses a purely digital and statistical approach taking account of specific functions and objective constraints that must be minimized (state-space models, for example). It does not use a technical engineering model of the building and of the energy systems. This approach has a relatively low calculation burden, and is therefore capable of responding rapidly. A generic model can be applied to different buildings and statistical learning techniques can be used to choose the parameters of the models defined. But this "black-box" approach, which relies on statistical comparisons but does not take sufficient account of the underlying physics associated with the energy behavior of buildings, is difficult to translate into practical and concrete actions (as the actions envisaged are limited, not graduated, and their impact cannot be quantified with enough precision). The confidence intervals are often greater than the estimated value of the impacts.

U.S. Pat. No. 9,612,591 (application no. US2015/192911) describes an example of a method and system for optimizing and controlling the energy consumption of a building. A first computing device generates a set of thermal response coefficients for the building based on the energy characteristics thereof and the weather data associated with the location of the building. The first computing device predicts an energy response for the building based on the set of thermal response coefficients and the forecast weather conditions associated with the location of the building. The first computing device selects the minimum energy needs of the building based on an energy consumption cost associated with the building. The first computing device determines one or more temperature set points for the building based on the energy response and the minimum energy needs. The first computing device transmits one or more temperature set points to a thermostat in the building.

This method of the prior art provides for the following steps:
Reception by a first calculation device of one or more measurements from a plurality of sensors, at least some of which are situated inside the building, the measurements comprising temperature readings and comfort characteristics;
Calculation by the first computing device of a set of thermal response coefficients for the building based on the energy characteristic of the building, the measurements from the sensors and the weather data associated with the location of the building;
Calculation by the first calculation device of an energy response level for the building as a function of the set of thermal response coefficients and of the weather forecasts associated with the location of the building;
Determination by the first calculation device of a series of energy control points for each of the comfort devices in the building based on the energy response of the control points that may be actuated to adjust one or more operational comfort parameters;

Optimization by the first computing device of the series of energy control points based on an estimated energy cost for a plurality of predetermined time periods such that the corresponding comfort devices consume less energy during periods with a high estimated energy cost and more energy during time periods with a low estimated energy cost;

Collection by the first calculation device for each of the plurality of predetermined time periods of the temperatures detected by one or more sensors in the different rooms of the building, by one or more sensors outside the building and by a thermostat inside the building;

Verification by the first calculation device of whether the temperature readings from the one or more sensors in the different rooms of the building diverge over time from the temperature readings of the sensor(s) outside the building and from the temperature readings of the thermostat; and If at least one of the detectors in the different rooms of the building diverges over time from the temperature readings of the sensor(s) outside the building and from the temperature readings from the thermostat:

Adjustment by the first calculation device of the series of energy control points for one or more comfort devices associated with the room with the divergent sensor to take account of the temperature divergence.

The following two scientific articles are also known:

Yu, Wei & Li, Baizhan & Jia, Hongyuan & Zhang, Ming & Wang, Di. (2015), "Application of multi-objective genetic algorithm to optimize energy efficiency and thermal comfort in building design," Energy and Buildings, vol. 88, pp. 135-143. This article describes a multi-objective optimization model that can help designers in the design of ecological buildings. This article proposes the use of the Pareto solution to obtain a set of optimal optimization solutions for building design. An improved multi-objective genetic algorithm (NSGA-II) forms the theoretical basis for modeling a multi-objective optimization model. Based on the simulation data on energy consumption and indoor thermal comfort, an optimized back-propagation network based on the simulation, optimized by a genetic algorithm (GA) is used to characterize the behavior of buildings, then a network model is established allowing rapid prediction of the energy consumption and indoor thermal comfort state of residential buildings.

O'Neill, Z. & Eisenhower, "Leveraging the analysis of parametric uncertainty for building energy model calibration," B. Build. Simul. (2013), Springer Berlin Heidelberg Print ISSN 1996-3599, describes calibrated energy models used to measure and verify building renovation projects, predict savings made due to the energy conservation measures and commission construction systems (both before occupation and during monitoring, performance controls and diagnostics based on a real-time model).

This article presents an automated and systematic method of calibrating a building energy model. Effective calibration of the parameters allows over two thousand model parameters to be analyzed and those that are critical (the most important) identified in order to adjust the model.

The parameters that most affect the final energy use in the building are selected and automatically refined to calibrate the model by applying metamodel-based analytical optimization. The real-time data for an office block, including data for energy meters and energy in 2010, were used to calibrate the model, while the 2011 data were used to verify the model. The modeling process, the calibration and verification results, and the implementation problems encountered throughout the model calibration process were discussed from the point of view of the user. The total electricity consumption forecasts for the installations and plugs based on the calibrated model correspond to the actual measured monthly date to within ±5%.

A first drawback of the solutions of the prior art is the recourse to genetic algorithms to solve multi-objective optimization problems requiring a large number of simulations to calculate a Pareto optimum and determine the optimal allocation of comfort resources. This leads to prohibitive calculation costs when the processing is combined with simulation programs such as the buildings and systems thermal simulation application TRNSYS (trade name).

Moreover, the precision and robustness of the results remain somewhat approximate.

Further, the solutions of the prior art usually require the construction of complex and imperfect theoretical models of the superstructures, thermal flows and energy and thermal behaviors for each of the elements present in the building. The elements are established a priori by experts, so as to model the building realistically, but do not take account of real observations obtained in the building in order to calibrate the theoretical model so that it best describes the actual behavior of the building studied.

One embodiment of the disclosure minimizes total energy consumption over a year and to optimize thermal comfort (defined as the fraction of the number of hours in the year when the temperature is between 18 and 26 degrees) and to measure the difference from a given comfort temperature (19° and 22° are not considered comfortable in the same way, contrary to what is proposed in the article by Yu et al. and only during occupation.

BRIEF SUMMARY

To overcome these drawbacks, the present disclosure relates in its most generally accepted meaning to a method for optimizing the energy expenditure and comfort of a building comprising:

a plurality of comfort systems provided with an online consumption sensor, suitable for periodically remotely transmitting consumption data associated with an identifier of the comfort system, a plurality of local environment data sensors (temperature, luminosity, $CO_2$, etc.) associated with an identifier of a zone of the building, at least one server for collecting and recording the timestamped data remotely transmitted by the consumption sensors and for collecting data external to the building as well as internal data.

Wherein, the method comprises the following steps:

constructing and saving a simplified digital model of the thermal behavior of the building for which the parameters are estimated using the timestamped data remotely transmitted by the online consumption sensors and by the local environment sensors, by integration processing of all the characteristics of a building and its comfort systems for the detailed study of the building depending on the location of the building, the construction materials used, the overall architecture, and the chosen energy concept, a step of calibrating the simplified digital model calculated during the preceding step, a step of validating the calibrated digital model calculated during the preceding step by comparing the digital variables obtained by predictive processing of the calibrated model and the digital variables stored by the server over a period of a few days, a step of calculating digital parameters for resource allocation by applying a Pareto optimum calculation using a multi-objective optimization algorithm applied to the validated calibrated digital model.

According to advantageous variants:

the Pareto criterion is determined by the historical target temperatures;

the Pareto criterion is determined by a set of new target temperature values;

the optimum Pareto calculation is implemented using a genetic NSGA-II algorithm.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

The present disclosure will be described in more detail with reference to a non-limiting embodiment.

Material Architecture

The description that follows presents an example of effective multi-objective methodology to improve energy efficiency and maintain thermal comfort, without intervention to renovate or modify the building envelope.

The building comprises a plurality of comfort systems such as heating systems, light sources, air-conditioning systems, aeration systems, how or cold water supply points, etc.

Figure 1:
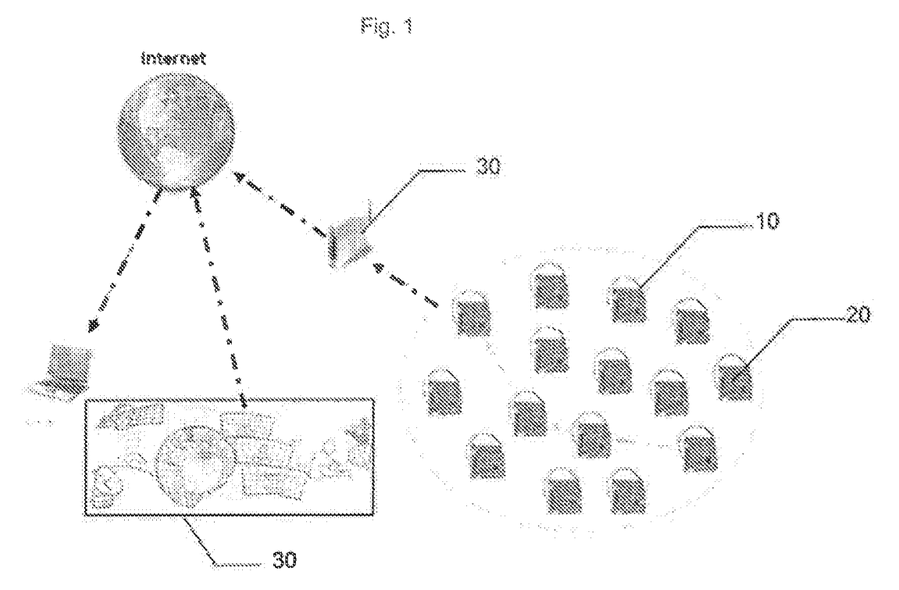
FIG. 1 is a schematic representation of an environment in which embodiments of the present disclosure may be implemented.

These systems are associated with sensors 10 communicating with a server 30 via the wired network or via a radiofrequency network to communicate information on the state of the associated system and on the main energy consumption points. The building also comprises local environment data sensors 20 transmitting data to the server 30 on a comfort parameter in the local zone where the sensor is installed.

The sensors 10, 20 provide information in the form of digital sequences comprising an identifier of the sensor and at least one digital value for the parameter measured. The server 30 controls the timestamping of the data received and recording in permanent storage.

The server 30 also receives and stores timestamped outdoor environment data, notably weather information from data sources.

The data recorded by the server 30 are subject to processing in accordance with the method according to the disclosure, associating an energy program for the building with optimization processing.

For example, the energy program may be a tool such as the Energy Plus (trade name) application developed based on the BLAST (trade name) and DOE-2 (trade name) tools and incorporating specific modules for introducing systems into the thermal zone energy balance and input and output data structures defined from the digital data recorded by the server 30.

The energy program may consist of the specialized TRNSYS (trade name) application for dynamic thermal simulation applied to buildings. This application allows all the characteristics of a building and its systems (heating, air conditioning) to be incorporated in order to carry out a detailed mono-zone or multi-zone study of its thermal behavior. It incorporates variables for location, construction materials, overall architecture, and the chosen energy concept, including more complex systems such as innovative solar systems.

The function of the optimization processing (single-objective or multi-objective) is to analyze the envelopes, orientations, shading or material characteristics and allow a diagnosis to be made.

It may be carried out using the Global Python Parallel-PyGMO (trade name) toolbox applications constituting a multi-objective optimizer that allows a simplified model to be designed.

The simplified model is obtained either based on a schematic view of the building, or following a complex campaign of time and resource measurement where trained professionals define the parameters that characterize the physical properties of the building.

The parameters of the simplified model are then calibrated using measurements (temperatures, consumptions, programming, etc.) obtained from thousands of communicating sensors placed in a real building to store a very large number of real-time data. The physical parameters of the simplified model are estimated using PyGMO add-on software with the measurements and the CMA-ES algorithm.

Next, the estimated model is validated using the TRNSYS (trade name) program to ensure that the resulting base model imitates the thermal behavior of the actual building.

A multi-objective methodology to improve energy efficiency and maintain thermal comfort is then implemented acting only on the building management system without modifying the physical parameters.

The NSGA-II approach is used to obtain the optimal Pareto parameters. The performance of the methodology is assessed based on data collected in a building situated in the Paris region.

Functional Architecture

The first step of the method according to the disclosure involves designing a simplified model of the building for which the parameters are estimated using measurements obtained from communication-capable sensors.

First Step: Definition of a Simplified Model

The base model was implemented using the TRNSYS IT solution (Type 56 component) and taking account of a plurality of parameter types. Building managers usually know some of these parameters precisely whereas others are not known or not well understood.

The single-zone base model is defined by the following components.

A plurality of vertical external walls. Each of these walls is specified by the following parameters: surface area, proportion of windows relative to wall, orientation, thickness and constituent layers such as concrete, insulation, etc.

A roof and a floor specified by: surface area and thicknesses of the various constituent layers, including the insulation.

Maximum heating and air conditioning (AC) power available at the emitters and at central production.

Schedules and temperatures for the heating, ventilation and air conditioning (HVAC) systems. A schedule consists of a start time, a time until shut down, a comfort temperature when occupied and lower temperatures when not occupied. Three (or four) program schedules are considered for each week: (i) Monday, (ii) Tuesday, Wednesday, Thursday, (iii) Friday (and (iv) weekend, if different from Friday).

Other parameters characterizing thermal contributions inside the building, such as the number of occupants, the number of items of IT equipment, PCs, and the lighting systems characterized by a number of W/m$^2$.

In most cases, the structure of the walls, of the roof and of the low floors are fairly well known, as is the overall orientation of the building and the glazed surface area, but the thickness and the nature of the insulation is usually not well known and must be estimated to within a realistic range of values.

Furniture that forms a substantial thermal energy store is summarized in a single parameter known as capacitance, expressed in kJ/° C./m$^3$ and sized in proportion to the total volume.

Second Step: Calibration of the Simplified Model

As the objective is to improve thermal efficiency without renovation work, the calibration procedure must estimate the parameters linked to the building envelope. Some of these parameters are known or do not need to be calibrated, such as the structure of the external walls, of the roofs and of the low floors, or the window types. The other parameters linked to the building envelope required in order to define the TRNSYS model and the parameters linked to the building control strategy are summarized in the table shown in FIG. 2.

Figure 2:
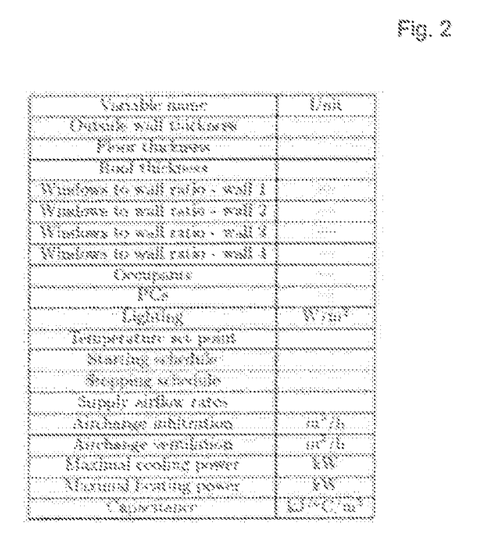
FIG. 2 is a summary of the parameters linked to the building control strategy.

Hereinafter, these parameters are designated by $\theta$. The initial value of $\theta$ is chosen according to data determined by the building construction or redevelopment date.

The estimation procedure uses the data recorded by the server 30 over a month, based on hourly readings. The data recorded each hour comprise outdoor temperature $T_e^{obs}$, average indoor temperature $T^{obs}$ measured in the building, energy consumption for heating $Q_h^{obs}$ and for cooling $Q_c^{obs}$. The other data are recorded in a table of variables such as that shown in FIG. 2.

The covariance matrix adaptation evolution strategy (CMA-ES) is implemented with the PyGMO (trade name) application toolbox to optimize iteratively the parameters in the table of variables using the selection ($\mu$, $\lambda$).

At each iteration, the best descendant parameters ($\mu$, $\lambda$) from the actual estimation of the parameters are combined to form the population of the next iteration and the other candidates are rejected.

For each parameter $\theta$, the TRNSYS model is executed with the stored weather conditions to produce hourly energy consumptions and the associated indoor temperatures.

The objective function minimized by the CMA-ES takes account of the difference between these hourly simulations and the actual observations measured in the building:

$f_{calib}: \theta \rightarrow \omega_t \log(1+\|T_i^\theta - T_i^{obs}\|_2) + \omega_q \log(1+\|Q^\theta - Q^{obs}\|_2)$, where:

$T_i^\theta$ and $Q^\theta$ designate the indoor temperatures and the total energy consumptions (heating, cooling and other expenditures) formed by the time series produced by the TRNSYS model with a given parameter $\theta$, for any time series s, such that:

$$\|s^\theta - s^{obs}\|_2 = \left(\frac{1}{n}\sum_{k=1}^{n}|s^\theta(k) - s^{obs}(k)|^2\right)^{1/2}$$

where n equals the number of samples.

Step 3: Validation of the Model

Once the CMA-ES algorithm has reached a state of convergence, the TRNSYS model is trained using observations to ensure calibration relative to the actual building.

To ensure that the base model thermal behavior corresponds to the thermal behavior of the actual building, the model predictions are compared to the observations recorded for the week following the calibration period and for another subsequent period.

All the parameters linked to the building envelope estimated during the calibration procedure are fixed and are considered as the building signature. Next, the parameters linked to the construction control strategy are fixed to the actual construction parameters for each validation period. The calibrated model is executed using these settings and the stored weather conditions and compared to the observations.

Step 4: Pareto Optimization

When the model has been calibrated and validated, Pareto optimization is carried out so that the energy performance of the building can be analyzed, by optimizing energy consumptions while maintaining a thermal comfort chosen by the model. The parameters used to improve energy efficiency are designated by $\eta$. All the other parameters are defined by the parameters calibrated in $\theta$.

For each parameter $\eta$, the TRNSYS model is executed with the stored weather conditions to produce the associated hourly energy consumptions and indoor temperatures for the following week. The objective function minimized by the NSGA-II algorithm aims to find a compromise between minimizing total energy consumptions and providing a thermal comfort specified by the user:

$f_{optim}: \eta \rightarrow (f_{optim}^1(\eta), f_{optim}^2(\eta))$, with $f_{optim}^1(\eta) = \log\left(1 + \left(\frac{1}{p}\Sigma_{k=1}^{P}|T_i^\eta(k) - T_i^*(k)|^2 1_{k \in I}\right)^{1/2}\right)$, $f_{optim}^2(\eta) = \log(1 + \|Q^\eta\|_2)$, where $T_i^*$ designates the sequence of indoor temperatures desired by the energy managers.

Various optimization configurations may be envisaged.

a) Optimization with historical target temperatures. In this case, the sequence $T_i^*$ determined to allow adjustment to the temperatures observed in the building during the optimization period. Optimization aims to find parameters to reduce energy consumptions without changing the thermal comfort.

b) Optimization with new target temperatures. In this case, the thermal comfort recorded with the sensors is assumed to be too conservative and the optimization procedure allows the temperature set points to be changed to improve efficiency with a new reference thermal comfort.

Optimization is carried out using the NSGA-II method for multi-objective problems implemented in PyGMO, based on a non-dominated descendant selection procedure.

Experimental Results

According to one embodiment, the data used were collected in a 7-story office building of 14,000 m² floor space situated in the Paris region for a total volume of 51,800 m³. Based on a commonly used rule, it is assumed that ⅔ of the total area is occupied by people, which gives a total occupation area of 9240 m². Assuming that each occupant has 12 m², the initial values are set at 770 occupants and 770× 1.2=924 PC in the building during the hours of occupation. The wall areas, on the other hand, are 3.7×7×50=1295 m² and 3.7×7×40=1036 m², respectively.

Figure 3:
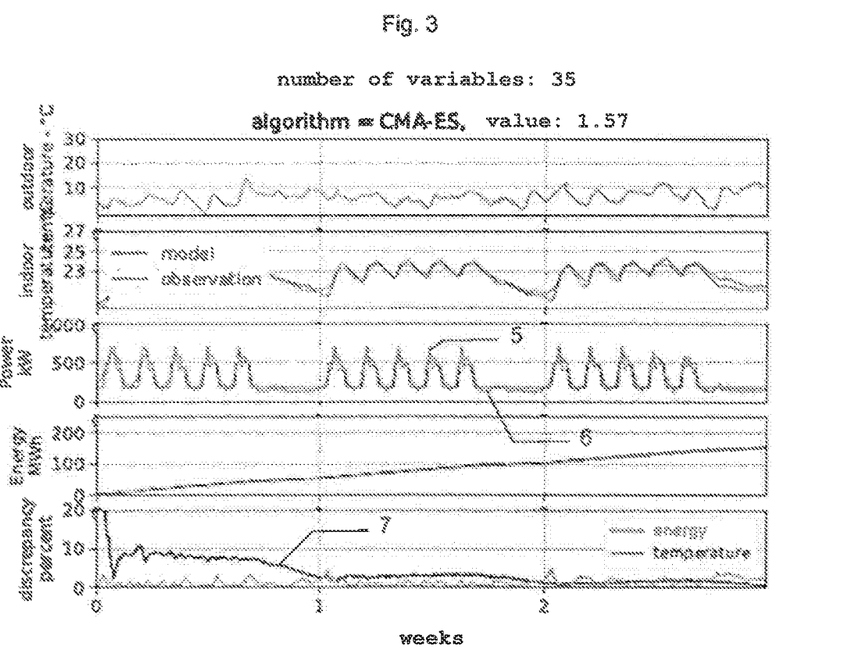
FIG. 3 shows the calibration results in the table of parameters and time series.

In the results obtained, the model is calibrated using a month of data stored every hour such that n=720. The calibration results are shown in the table of parameters in FIG. 3. The CMA-ES algorithm is executed with a population size given by λ=4+3 log (card(θ)) and the parameter μ by default. The parameters are initialized randomly within the interval given in Table 1 and the estimation procedure is repeated 50 times and stopped after 800 generations when the algorithm has reached convergence. The estimated average value and the standard deviation over 50 independent trials are given for each parameter in the table in FIG. 2. FIG. 3 shows the outdoor temperature evolution curve 5 (at the top) and the estimated indoor temperature curve 6 as well as the curve 7 showing estimated energy consumption.

These estimated chronological series are compared with the observations from the building sensors. The last graph shows the relative error between the estimated chronological series and the observations over time. For any time series, this relative error is given for any 1≤k≤n, by:

$$\varepsilon_s(k) = \frac{|s^\theta(k) - s^{obs}(k)|}{s^{obs}(k)}$$

Figure 4:
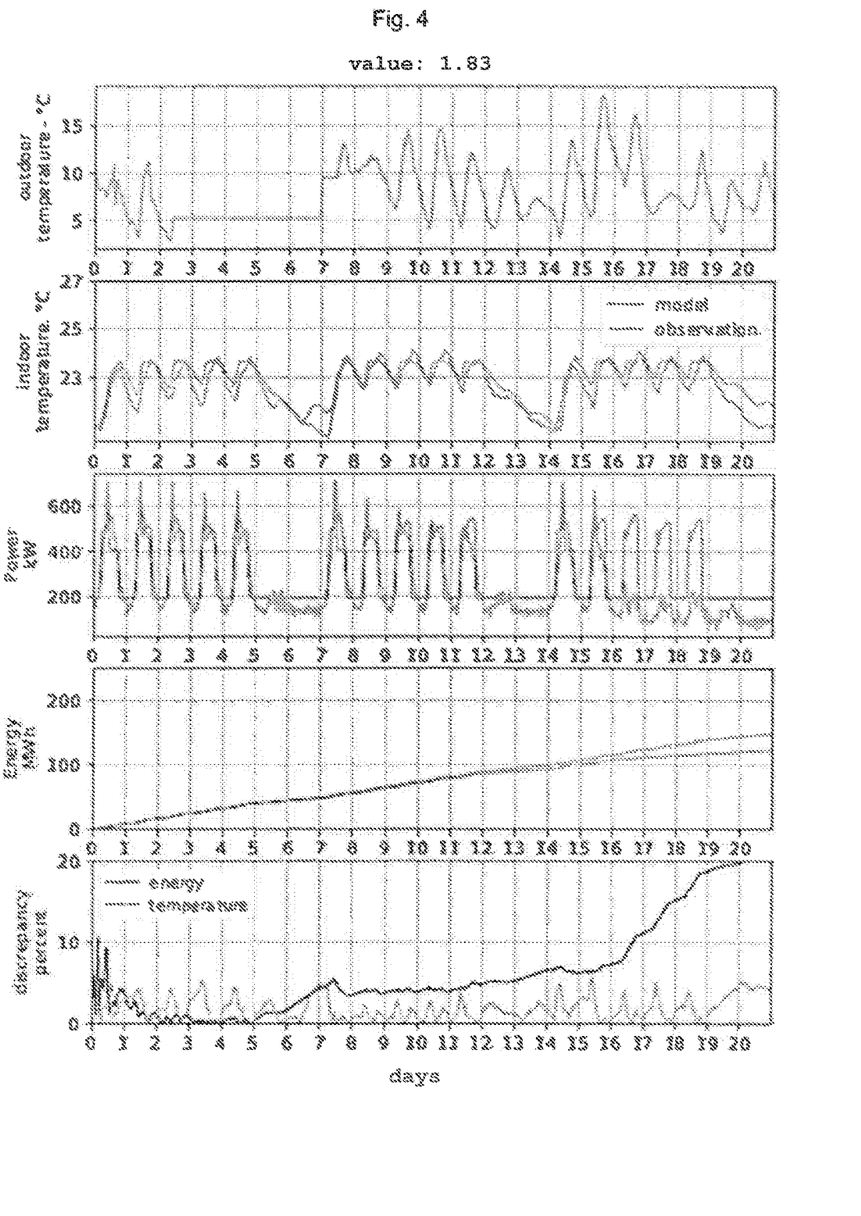
FIG. 4 shows the result of the optimization with historical target temperatures.

The estimated model is used to predict the weekly temperatures and consumptions after the calibration period (FIG. 3) and during a period N (FIG. 4).

FIG. 4 shows the result of the optimization with historical target temperatures.

The average temperature in the building during an hour of occupation was 23.4 degrees with a standard deviation of 0.67. Total energy consumption was 342.6 kWh. The results of the NSGA-II algorithm show that for a similar temperature volatility about 23.4 degrees, other construction parameters may lead to a total energy consumption of 300 kWh. The associated parameters are given in the table of parameters and the time series are displayed in FIG. 3. FIG. 4 shows optimization with new target temperatures. This demonstrates that significant gains may be obtained by reducing the target temperatures if the energy managers accept such a moderation of the target temperature.

The method according to the disclosure allows the lack of information and data imprecision inherent to any building in real use to be overcome in a profitable and generalizable way. It also allows a dynamic physical thermal model to be produced that is very close to the real operation of the building (usually to within a few percentage points of reality). Furthermore, it allows explicit results to be obtained on the improvement actions that should be undertaken (system settings, programming, building work, energy supply contract optimization) and allows the impacts of the improvement actions to be quantified in terms of enhanced comfort and energy efficiency.

The invention claimed is:

1. A method for optimizing energy expenditure and comfort of a building that includes:
    a plurality of comfort systems provided with an online consumption sensor, suitable for periodically remotely transmitting consumption data associated with an identifier of a comfort system of the plurality of comfort systems; and
    a plurality of local environment data sensors associated with an identifier of a zone of the building;
    wherein, the method comprises the following steps:
        constructing and saving on a remote server a simplified digital model of a thermal behavior of the building for which parameters of the simplified digital model are estimated using th-e-timestamped data remotely transmitted to the server by the online consumption sensors and by the plurality of local environment data sensors, by integration processing of characteristics of the building and the plurality of comfort systems depending on a location of the building, construction materials used in the building, the overall architecture of the building, and a chosen energy concept;
        a step of calibrating the simplified digital model calculated during the preceding step;
        a step of validating the calibrated simplified digital model by comparing digital variables obtained by predictive processing of the calibrated simplified digital model and digital variables stored by the server over a period of a few days; and
    wherein the parameters of the simplified digital model of the thermal behavior of said building are estimated during said step of constructing and saving a simplified digital model, using said timestamped data transmitted by said online consumption sensors as well as the timestamped data transmitted by said local environment data sensors,
    said method further comprises an additional step of calculating numerical parameters aimed at finding a compromise between minimizing total energy consumption and providing user-specified thermal comfort by applying a Pareto optimum calculation to said validated calibrated simplified digital model, for:
        optimization with historical target temperatures to determine parameters for reducing energy consumption without altering thermal comfort or
        optimization with new target temperatures to modify temperature setpoints to improve efficiency with a new thermal comfort reference.

2. The method of claim 1, wherein the Pareto optimum calculation is implemented by using a genetic NSGA-II algorithm.

3. The method of claim 1, wherein a criterion for the Pareto optimum calculation is determined by historical target temperatures.

4. The method of claim 3, wherein the Pareto optimum calculation is implemented by using a genetic NSGA-II algorithm.

5. The method of claim 1, wherein a criterion for the Pareto optimum calculation is determined by a set of new target temperature values.

6. The method of claim 5, wherein the Pareto optimum calculation is implemented by using a genetic NSGA-II algorithm.

* * * * *

UNITED STATES PATENT AND TRADEMARK OFFICE
CERTIFICATE OF CORRECTION

PATENT NO. : 11,994,883 B2
APPLICATION NO. : 16/976394
DATED : May 28, 2024
INVENTOR(S) : Gilles Noziere It is certified that error appears in the above-identified patent and that said Letters Patent is hereby corrected as shown below:

On the Title Page
In ITEM (54)　　　　Line 1,　　change "METHOD FOR OPTIMISING THE ENERGY" to --METHOD FOR OPTIMIZING THE ENERGY--

In the Specification
　　Column 1,　　Line 1,　　change "METHOD FOR OPTIMISING THE ENERGY" to --METHOD FOR OPTIMIZING THE ENERGY--

In the Claims
Claims Heading,　　Column 10,　　Line 7,　　change "The invention claimed is:" to --What is claimed is:--
Claim 1,　　Column 10,　　Line 21,　　change "using the timestamped" to --using timestamped--

Signed and Sealed this
Twenty-third Day of July, 2024

Katherine Kelly Vidal
*Director of the United States Patent and Trademark Office*